(12) United States Patent
Kamiyama et al.

(10) Patent No.: US 6,264,357 B1
(45) Date of Patent: *Jul. 24, 2001

(54) APPARATUS FOR SUSPENSION POLYMERIZATION

(75) Inventors: Masafumi Kamiyama; Haruhiko Yano; Minoru Tsuchida, all of Shizuoka; Eiji O'Shima, Tokyo, all of (JP)

(73) Assignee: Tomoegawa Paper Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/181,539

(22) Filed: Dec. 27, 1993

Related U.S. Application Data (60) Continuation of application No. 07/840,181, filed on Feb. 24, 1992, now abandoned, which is a division of application No. 07/658,878, filed on Feb. 22, 1991, now Pat. No. 6,140,394.

(30) Foreign Application Priority Data

Feb. 23, 1990 (JP) .................................................... 2-43980
Apr. 20, 1990 (JP) .................................................. 2-102925

(51) Int. Cl.$^7$ ............................................................. B01F 5/06
(52) U.S. Cl. ....................... 366/176.1; 366/303; 366/304
(58) Field of Search ........................... 366/176, 176.1, 366/303, 304

(56) References Cited

U.S. PATENT DOCUMENTS

| | | | | |
|---|---|---|---|---|
| 1,690,668 | * | 11/1928 | China ........................... | 366/176 |
| 1,728,178 | * | 9/1929 | Eppenbach ..................... | 366/176 |
| 1,738,288 | * | 12/1929 | Eppenbach ..................... | 366/176 |
| 1,941,808 | * | 1/1934 | McConnaughay .............. | 366/177 |
| 2,738,930 | | 3/1956 | Schneider . | |
| 3,185,661 | * | 5/1965 | Hubby ........................... | 523/318 |
| 3,488,699 | * | 1/1970 | Lee et al. ..................... | 366/176 |

FOREIGN PATENT DOCUMENTS

| | | |
|---|---|---|
| 0051210 | 5/1982 | (EP) . |
| 2192558 | 1/1988 | (GB) . |

* cited by examiner

Primary Examiner—Fred Teskin
(74) Attorney, Agent, or Firm—Pillsbury Winthrop LLP (57) ABSTRACT

A method of suspension polymerization of a monomeric composition to produce a polymer or a polymer composition is disclosed which method comprises the steps of retaining a disperse phase component composed of the monomeric composition and a continuous phase component composed of a medium in independent vessels, supplying the disperse phase component and the continuous phase component from their respective vessels into a disperser simultaneously and continuously through associated independent passageways, applying shear force in the disperser to form a dispersion having droplets of a desired size, subsequently introducing the dispersion into a polymerization vessel, and completing a polymerizating reaction to produce a polymer or a polymer composition.

13 Claims, 6 Drawing Sheets

APPARATUS FOR SUSPENSION POLYMERIZATION

This is a continuation of application Ser. No. 07/840,181, filed on Feb. 24, 1992, now abandoned, which was the Divisional of Ser. No. 07/658,878 filed Feb. 22, 1991, now U.S. Pat. No. 6,140,394.

BACKGROUND OF THE INVENTION

1. Field of the Invention

The present invention relates to a method of producing particles of polymerization products, particularly those having controlled particle sizes and size distributions, that are suitable for use in the powder making industry. Examples of the products include gap retainers, slip imparting agents, functional carriers, monodispersed particles having surface activity, standard particles, toners, and functional fillers that control the fluidity and gloss characteristics of paints. More particularly, the present invention relates to an improved process for producing particles having a size of 5–50 $\mu$m by suspension polymerization.

2. Background of Related Art

The importance of powder making technology which takes advantage of the various functions of particles per se is increasingly recognized these days. Among the particles produced by this technology are gap retainers, slip imparting agents, functional carriers, monodispersed particles having surface activity, standard particles, toners, and functional fillers that control the fluidity and gloss characteristics of paints. In order to produce these particles by polymerization, emulsion polymerization is used most commonly today. In speciality applications, other methods of polymerization are employed, such as soap-free polymerization, dispersion polymerization, seed polymerization and swelling polymerization.

However, these methods of polymerization have several defects. For example, considerable difficulty is involved in removing non-negligible impurities such as emulsifiers. Second, the size of particles that can be produced is limited. Third, the production cost is exorbitant. Fourth, these methods are too complex to be suitable for large-scale production. Particles having a narrow size distribution are in most cases produced by emulsion polymerization but the size of particles that can be produced by this method is only about 1 $\mu$m at maximum and producing larger particles is extremely difficult.

Suspension polymerization is also capable of producing particles, however, the only products obtained so far are nonuniform in particle size and have a broad particle size distribution. Since particle size and size distribution are closely related to the performance of polymer products in such aspects as mechanical strength, chemical resistance, color, transparency and moldability, improvements in those factors are desired. In suspension polymerization, the liquid droplets dispersed under agitation have various sizes and during dispersion they are subjected to repeated breakup and coalescence to produce particles having an extremely broad size distribution. For this reason, it is very difficult to produce by suspension polymerization those particles which have as narrow a size distribution as monodispersed particles. Under these circumstances, one of the objectives in the powder making industry is to establish a simple technique of suspension polymerization that is capable of producing homogeneous particles.

The mechanism by which particles are produced by suspension polymerization is as follows. A disperse phase and a continuous phase are broken up by applied energy, such as agitation, to form droplets that are dispersed in the continuous phase. The droplets, if they are left as they are, are generally unstable and undergo repeated breakup and coalescence, but eventually they are supplied with energy, such as heat, to be polymerized to form rigid and stable particles that are no longer capable of breakup and coalescence. Therefore, in order to control the size of particles produced by suspension polymerization, one may control in some way the size of the droplets and the process of their breakup and coalescence. In fact, however, there are many factors that relate to the size of the droplets, such as the characteristics of a disperser (which is hereinafter referred to as a "granulator"), its construction, shape, rotational speed, size, or the size and shape of the reaction vessel, the amount in which the reaction solution is charged, or the ratio between disperse and continuous phases in the reaction solution, its viscosity, as well as the type and amount of a dispersant used, and it is practically impossible to control all of these factors in a desired way. Therefore, in practice, some of these factors have to be fixed so that suitable conditions for producing desired particles are determined with the other factors being varied.

However, this approach depends so much upon a trial-and-error basis that it is not readily adaptable to design changes such as scale-up of the process. This is a serious obstacle to the production of desired particles and the process lacks flexibility, particularly for the purpose of producing particles that are to be used in powder form.

The present invention has been accomplished under these circumstances and an object of providing a method of suspension polymerization that is capable of producing smaller particles having a size distribution being controlled in an easy way.

SUMMARY OF THE INVENTION

As a result of the intensive studies conducted in order to solve the aforementioned problems of the prior art, the present inventors found a new method of production that solves those problems in a simple way.

The present invention relates generally to a method of suspension polymerization comprising the step in which a disperse phase composed of an addition polymerizable monomeric composition and a continuous phase containing a suspension stabilizer and other necessary dispersive aids are respectively retained in independent vessels and are supplied continuously into a granulator in controlled proportions through associated independent passageways to form a suspension having a group of polymerizable droplets of a desired size, and the step of recovering the suspension from the granulator and supplying it into a polymerization vessel in which a polymerization reaction is completed to produce a polymer. The method is characterized in that the disperse and continuous phases are supplied independently into a shear force generating field within the granulator, where a suspension is formed by shear force and allowed to leave the shear force generating field through a clearance of a specified size provided in that field, whereby the suspension having a group of polymerizable droplets of a desired size is produced.

In the method described above, the granulator generates shear force with a rotating part that preferably rotates at a speed of 3,000–50,000 rpm, more preferably at 10,000–30,000 rpm. The rotating part that generates shear force in the granulator is spaced from the stationary part by a gap of preferably 0.01–5.0 mm, more preferably 0.05–2.0 mm.

In order to control the size of particles produced by suspension polymerization, it is important to control the size of droplets undergoing polymerization reaction. The droplets are broken up by turbulent energy due to the agitation of the reaction solution. On the other hand, the droplets coalesce upon mutual contact. The final size of droplets is determined by the balance between these processes of breadkup and coalescence. As regards breadkup, the present inventors studied various methods for producing droplets having a size range not greater than 50 $\mu$m and found that the impact (shear force) created by blades in the dispersing apparatus was a predominant factor in controlling the size of droplets. The size of droplets formed by breadkup under the impact of blades depends on such factors as the state of droplets before breadkup, the intensity of shear force and the number of shear cycles. Droplets are subjected to shear force of the same strength irrespective of their size, so large droplets are broken up into smaller sizes under shear force but even if small droplets are supplied into an area where shear force is applied, they are further broken up into even smaller sizes until they are eventually emulsified. The emulsified components can no longer coalesce to form large particles and they are simply wasted (loss). In ordinary dispersers, droplets carried by circulating streams produced under agitation are broken up into smaller sizes when they pass through the shear region; at the same time, those droplets may also be broken up into smaller sizes by turbulent energy in a turbulent field created throughout the apparatus. However, the movement of droplets flowing within the apparatus is close to a random movement, so the generated droplets are likely to have a larger diameter distribution. Therefore, in order to achieve optimal control of particle size distribution, it is important that all droplets of interest be exposed to shear force under as equal conditions as possible and that a dispersion to be dispersed having a constant state should be supplied to the area of a dispersing apparatus where shear force is applied.

As regards the coalescence of droplets, it is considered to occur as a result of mutual contact of droplets. Generally, the smaller the size of particles, the greater the surface energy per unit volume and the stabler the particles that are available. Further, the factor that contributes to a broader size distribution is the presence of both large and small particles in the same system. Small particles tend to be absorbed by large particles with which they collide. However, in order to make particles sufficiently small to have an adequately stable interfacial energy, a correspondingly large energy must be supplied, so it is effective to divide the particles as they are concentrated in a small shear region. In addition, it is essential to provide a condition that insures regular breadkup in such a way that shear force will be applied uniformly to all the particles present.

The present invention has been accomplished on the basis of these observations. In accordance with the present invention, a disperse phase and a continuous phase are supplied via independent passages directly into a shear force producing field (shear region) in a dispersing apparatus at desired flow rates in specified proportions and the two phases, as they are mixed together under applied shear force, are dispersed to form droplets. In this instance, dispersing conditions such as the amount of droplets that pass through the shear region, their size and the ratio of disperse to continuous phase are placed under precise control to insure that both the disperse phase and continuous phases (phase ratio) are subjected to shear force under conditions that are kept constant, whereby droplets having a narrow size distribution are obtained. If particles of the desired size cannot be obtained by a single passage through the shear region, another dispersing apparatus may be provided so that the dispersion that passed through the first dispersing apparatus is passed through the second apparatus. In other words, the process described above may be repeated as many times as required.

The granulator to be used in the present invention is described below more specifically. For efficient production of fine particles, it is particularly important to control the shear region of the granulator.

A field of shear force generation in granulators is generally composed of a stationary part (stator) and a rotating part (rotor). It should, however, be mentioned that the part corresponding to the stationary part may be designed to be rotatable with a view to improving the efficiency of dispersion. In any case, the field of shear force generation which is necessary to disperse a dispersion may be regarded to lie in the gap between the stationary and rotating parts. In ordinary granulators, rotating blades as in a turbine are used as the rotating part, and the field of shear force generation which is needed to form the particles of 50 $\mu$m or less is provided by the gap between the periphery of turbine blades and the stationary part. Hence, the area over which shear force is generated is determined by a cross-sectional area of the turbine blades and it is difficult to increase of otherwise adjust that area. Further, the stationary part is usually provided with a liquid passage area, or a space that aids in fluid passage. Since no effective shear force is generated in this space, it is another factor that prevents effective granulation. Furthermore, this passage area is unable to prevent the presence of a solution to be granulated that fails stochastically to pass through the shear region in a satisfactory way during granulation. Therefore, the particles granulated with ordinary granulators have such a rough grain size distribution that more grains are present on the side of larger size. As a consequence, the rough grain size distribution of such particles has a tendency to broaden, which is by no means desirable for the purpose of obtaining particles having a narrow size distribution.

The present inventors made intensive efforts to solve these problems and found that when using a granulator in which the space for the field of shear force generation was made comparatively small and in which said field had a specified clearance (for restricting the size of droplets) through which the dispersion to be granulated that consisted of a disperse phase and a continuous phase had to pass by all means, fine particles having a narrow side distribution could be produced in a very effective way. The width of the clearance through which the dispersion is discharged can be adjusted to an optimal value in accordance with the desired average particle size or the desired spread of size distribution, whereby particles having the desired size and distribution can always be obtained.

The present inventors conducted further studies on the method of suspension polymerization of their own. As a result, they found that when a tubular rotating part having a smooth outer surface was used in a disperser in combination with a stationary part that had substantially the same internal shape as that rotating part in order to improve the efficiency of shearing action, an effective shear field was formed, thereby enabling fine particles of a narrow size distribution to be produced in a very effective manner.

The method of another aspect of the present invention generally relates to suspension polymerization of a monomeric composition to produce a polymer or a polymer composition and this method comprises the steps of retaining a disperse phase component composed of the monomeric composition and a continuous phase component composed of a medium in independent vessels, supplying the disperse and continuous phase components from their respective vessels into a disperser simultaneously and continuously through associated independent passageways, applying shear force in said disperser to form a dispersion having droplets of a desired size, subsequently introducing the resulting dispersion into a polymerization vessel, and completing a polymerization reaction to produce a polymer or a polymer composition. The method is characterized in that the disperser comprises a stationary part having a smooth inner surface and a tubular rotating part that is rotatably provided within the stationary part and that has a smooth outer surface.

The term "a tubular rotating part having a smooth outer surface" as used herein means a tubular rotating part having a flat surface that is not provided with any particular asperities, and the same applies to the "stationary part having a smooth inner surface".

DESCRIPTION OF THE PREFERRED EMBODIMENTS

The method of suspension polymerization of the present invention is described below with reference to the accompanying drawings.

Figure 1:
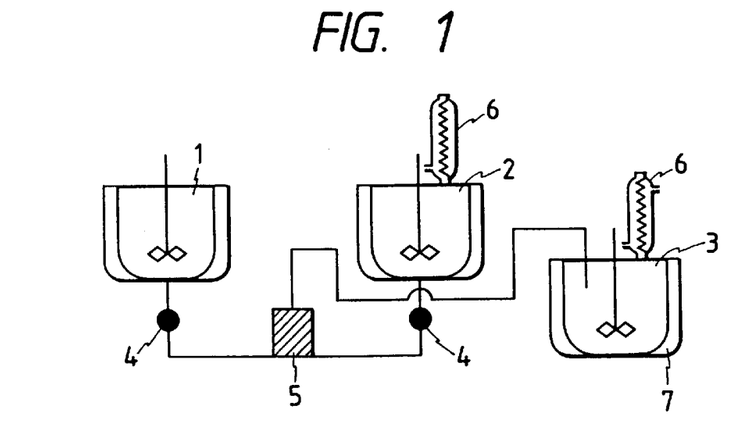
FIG. 1 is a schematic view showing the method of the present invention.

As shown in FIG. 1, the apparatus to be used in the practice of the present invention comprises a vessel 1 containing a continuous phase and a vessel 2 containing a disperse phase and equipped with a condenser 6, and the continuous and disperse phases are simultaneously supplied in specified proportions into a granulator via associated metering pumps 4. In the granulator 5, the disperse phase is suspended in the continuous phase under applied shear force, so that droplets of sizes in a certain range are produced. The suspension is discharged from the granulator 5 and directed into a reaction vessel 3 equipped with a condenser 6 and surrounded with a heating jacket 7. With the necessary heat being supplied from the jacket 7, a reaction polymerization is a completed to produce small and uniformly sized particles having a narrow distribution.

Figure 2:
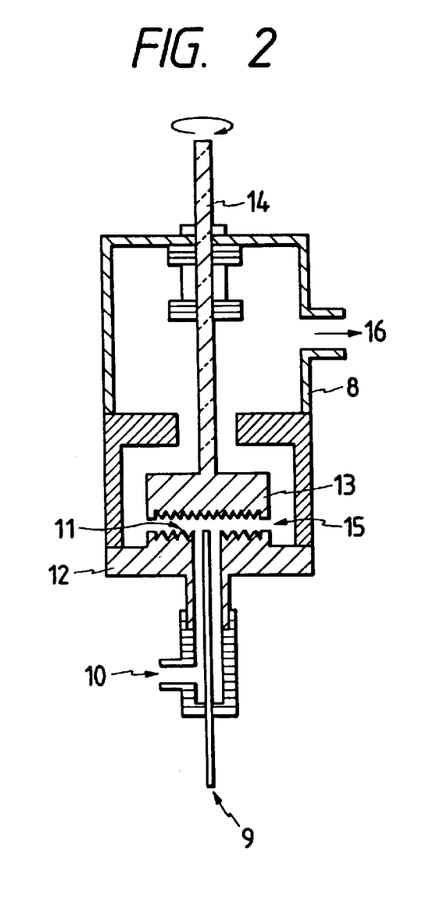
FIG. 2 is a cross-sectional view showing an example of the granulator that can be used in the method of the present invention.

An example of the granulator 5 is shown in FIG. 2. It has two inlets 9 and 10 in the bottom of a casing 8 through which the disperse phase and the continuous phase are respectively introduced into a shear force generating field 11. The shear force generating field 11 is composed of a stationary part 12 that is positioned below a rotating part 13 with a small gap provided therebetween. The surface of the shear force generating field is provided with random asperities having a height of 2–3 mm.

The rotating part 13 is rotated by means of a shaft 14 to produce a suspension by shear force within the shear force generating field 11. Both ends of the shear force generating field are provided with a clearance 15 of no more than about 1.8 mm which serves to restrict the discharge of suspension. The dispersion (suspension) passing through this clearance is discharged at an outlet 16 in the upper part of the granulator to be guided into the reaction vessel 3.

By the procedure described above, polymer particles not larger than 30 $\mu$m that have been considered to be difficult to produce by the prior art can be easily manufactured on an industrial scale. As a particular advantage, fine particles as small as 2–3 $\mu$m can be manufactured by the method of the present invention.

If the polymer particles become increasingly viscous as the suspension polymerization proceeds in the reaction vessel, the adhesive force of the particles will increase and even if agitation is performed, coalescence of those particles cannot be prevented; as a result, the particles will either grow in size or gel. In order to prevent these phenomena, suspension stabilizers and other aids are preferably used.

The materials that are used in performing suspension polymerization in accordance with the present invention are described below.

Suspension Stabilizer

Suspension stabilizers that are commonly used in suspension polymerization are water-soluble polymers having both a hydrophilic and a hydrophobic group in the molecule. Suspension stabilizers are those compounds in which polar groups such as a hydroxyl group, a carboxyl group or a salt thereof, and a sulfone group or a salt thereof are present as hydrophilic groups and nonpolar groups such as an aliphatic group and an aromatic group are present as hydrophilic groups and which are capable of stabilizing the granulated particles of polymeric composition by preventing their coalescence.

Examples of such suspension stabilizers include polyvinyl alcohol, casein, gelatin, cellulosic derivatives such as methyl cellulose, methylhydroxypropyl cellulose and ethyl cellulose, starch and its derivatives, poly(meth)acrylic acid and salts thereof. Inorganic powders such as calcium phosphate powder and a fine silica powder are also often used as suspension stabilizers. These suspension stabilizers cover the surfaces of droplets so that they will not coalesce or agglomerate during polymerization. If desired, surfactants such as sodium dodecylsulfonate and sodium dodecylbenzenesulfonate may be added as aids for suspension stabilizer.

Pigment and Polymerizable Monomer

The polymerizable monomers to be used in the present invention may be subjected to polymerization reaction in the presence of additives such as pigments. For example, if pigments such as carbon black is added to the polymerizable monomers, they can be readily used in the manufacture of electrophotographic toners.

Polymerizable monomers that can be used in the present invention include vinyl monomers such as styrene, amethylstyrene, divinylbenzene, acrylonitrile, acrylate esters and methacrylate esters and/or mixtures thereof.

Polymerization Initiator

Polymerization initiators that can be used in the present invention are those which are commonly used in the radical polymerization of vinyl monomers, as exemplified by organic peroxides such as benzoyl peroxide and butyl perbenzoate, and azo compounds such as azobisisobutyronitrile. These polymerization initiators may be used as dissolved in a solution of the polymerizable monomers described above, These polymerization initiators are usually added in an amount of ca. 0.1–10%, preferably 0.5–5%, of the weight of the polymerizable mixture.

EXAMPLES

The following examples and comparative examples are provided for the purpose of further illustrating the present invention but are in no way to be taken as limiting the invention.

Example 1

A solution as a continuous phase was prepared by dissolving polyvinyl alcohol (product of Tokyo Kasei K.K.; degree of polymerization, ca. 2,000; degree of saponification, ca. 80%) and sodium sulfate in water in respective amounts of 1% and 3% of water. The thus prepared continuous phase was charged into the container 1 shown in FIG. 1. A disperse phase was prepared by dissolving 15 g of 2,2'-azobisisobutyronitrile in a mixture of styrene (400 g) and butyl acrylate (100 g) and charged into the container 2 shown in FIG. 1.

In the next step, the disperse phase of the monomeric composition and the continuous phase were supplied into the granulator 5 shown in FIG. 2 at respective flow rates of 100 ml/min and 400 ml/min. The granulator was run at a rotational speed of 9,000 rpm, with the rotor 11 having a diameter of 50 mm. By this treatment in the granulator of the continuous and disperse phases that were supplied in the proportions specified above, a dispersion was obtained at the outlet of the granulator and that contained fine and uniformly sized droplets of the polymerizable monomers. The dispersion was then directed into the polymerization reactor 3 equipped with a turbine impeller. The inside of the polymerization reactor had been filled with nitrogen gas and with agitation by means of the turbine impeller at 300 rpm, polymerization was performed for 8 hours. The end point of polymerization was confirmed by the usual method adopted in suspension polymerization.

The polymer composition thus obtained wad cooled, filtered, washed thoroughly with water and centrifuged to produce a slurry of polymer particles.

Figure 3:
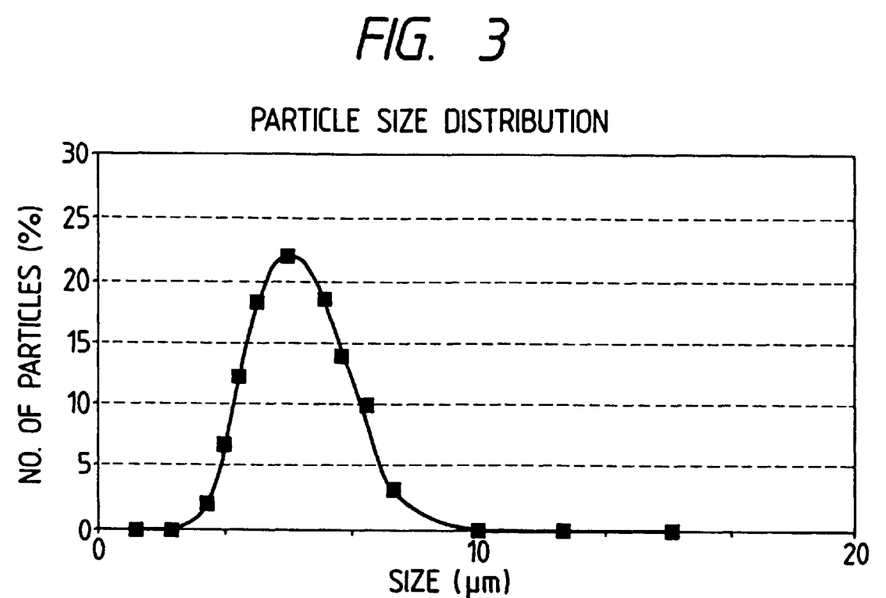
FIG. 3 is a graph showing the size distribution of the polymer particles produced in Example 1.

The size of the polymer particles was measured with a Coulter counter (aperture, 100 $\mu$m and the results are shown by a size-frequency curve in FIG. 3. As shown, the polymer particles obtained in Example 1 had a narrow size distribution, with the frequency of occurrence being the highest for particles having a size of ca. 5.5 $\mu$m.

Comparative Example 1

Suspension polymerization was performed as in Example 1 except that the rotor in the granulator was a turbine impeller consisting of four blades.

Figure 4:
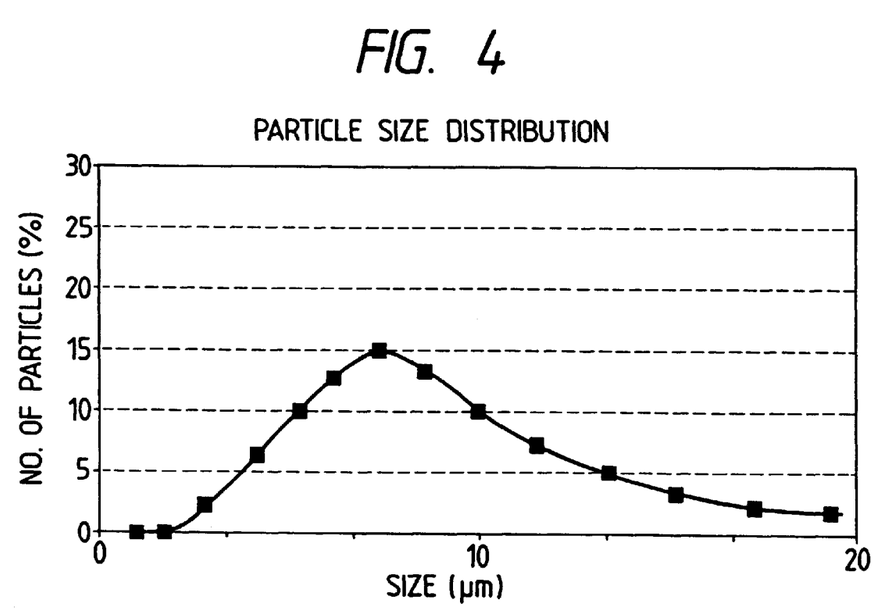
FIG. 4 is a graph showing the size distribution of the polymer particles produced in Comparative Example 1.

The size of the polymer particles obtained was measured with a Coulter counter (aperture, 100 $\mu$m) and the results are shown by a size-frequency curve in FIG. 4. As shown, the frequency of occurrence was the highest for particles having sizes of ca. 7.0–8.0 $\mu$m but the polymer particles obtained in Comparative Example 1 had a broader size distribution than those obtained in Example 1.

Example 2

A solution as a continuous phase was prepared by dissolving calcium phosphate and sodium dodecylsulfonate in water in respective amounts of 3% and 0.03% of water. The thus prepared continuous phase was charged into the container 1 shown in FIG. 1. A disperse phase was prepared by dissolving 15 g of 2,2'-azobisisobutyronitrile in a mixture of styrene (400 g) and butyl acrylate (15 g) and charged into the container 2 shown in FIG. 1. The subsequent procedures were the same as in Example 1.

Figure 5:
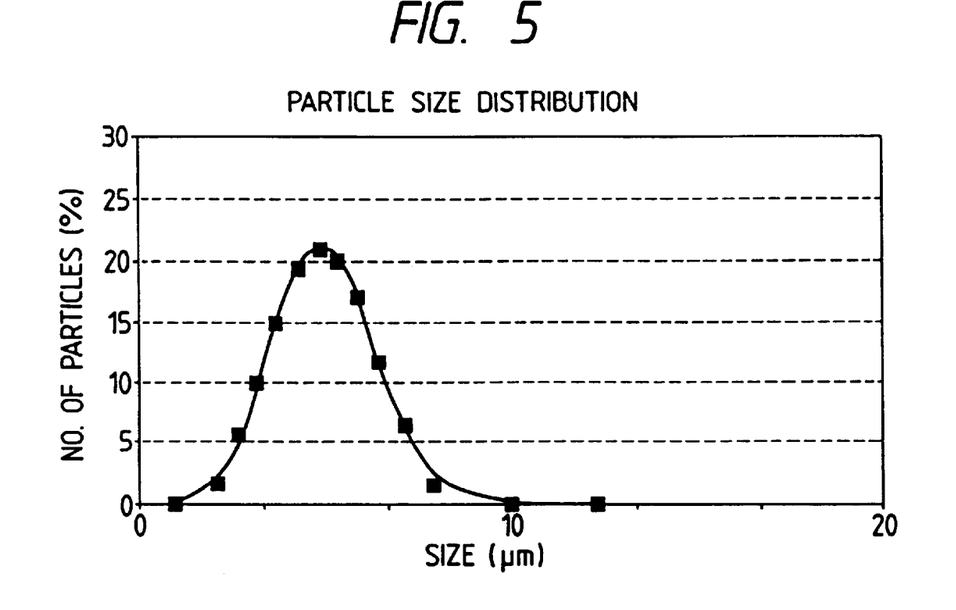
FIG. 5 is a graph showing the size distribution of the polymer particles produced in Example 2.

The size of the polymer particles obtained was measured with a Coulter counter (aperture, 100 $\mu$m) and the results are shown by a size-frequency curve in FIG. 5. As shown, the polymer particles obtained in Example 2 had a narrow size distribution, with the frequency of occurrence being the highest for particles having a size of ca. 5.5 $\mu$m.

Comparative Example 2

Suspension polymerization was performed as in Example 2 except that the rotor in the granulator was a turbine impeller consisting of four blades.

Figure 6:
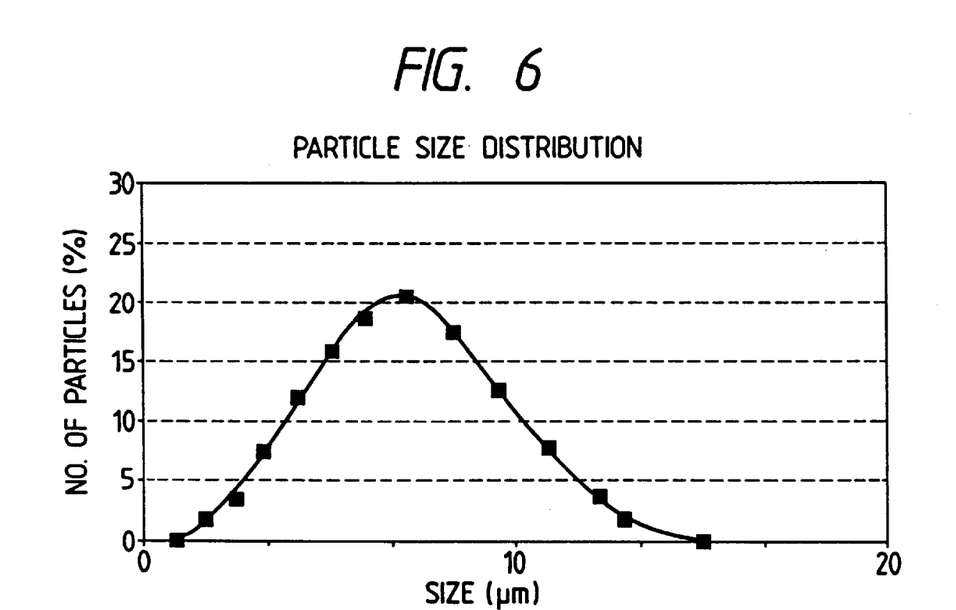
FIG. 6 is a graph showing the size distribution of the polymer particles produced in Comparative Example 2.

The size of the polymer particles obtained was measured with a Coulter counter (aperture, 100 $\mu$m) and the results are shown by a size-frequency curve in FIG. 6. As shown, the frequency of occurrence was the highest for particles having sizes of ca. 6–7 $\mu$m but the polymer particles obtained in Comparative Example 2 had a broader size distribution than those obtained in Examples 1 and 2.

As is clear from the foregoing description, the granulator used in implementing the method of suspension polymerization of the present invention has a precise and uniform shear force generating field between the rotating and stationary parts and fine droplets are produced by the strong forces of shear that are generated in said field. Further, only the droplets that leave the shear force generating field for passing through a small clearance of a predetermined size are supplied into the polymerization vessel. Since the droplets fed into the polymerization vessel are free from coalescence, polymer particles having a narrow size distribution can be easily produced with size ranging distribution can be easily produced with sizes ranging from ca. 30 $\mu$m down to as small as 2–3 $\mu$m.

Another embodiment of the present invention is described below in greater detail with reference to FIGS. 7 to 11.

In this embodiment, substantially the same apparatus as that shown in FIG. 1 is used except for the disperser structure.

Figure 7:
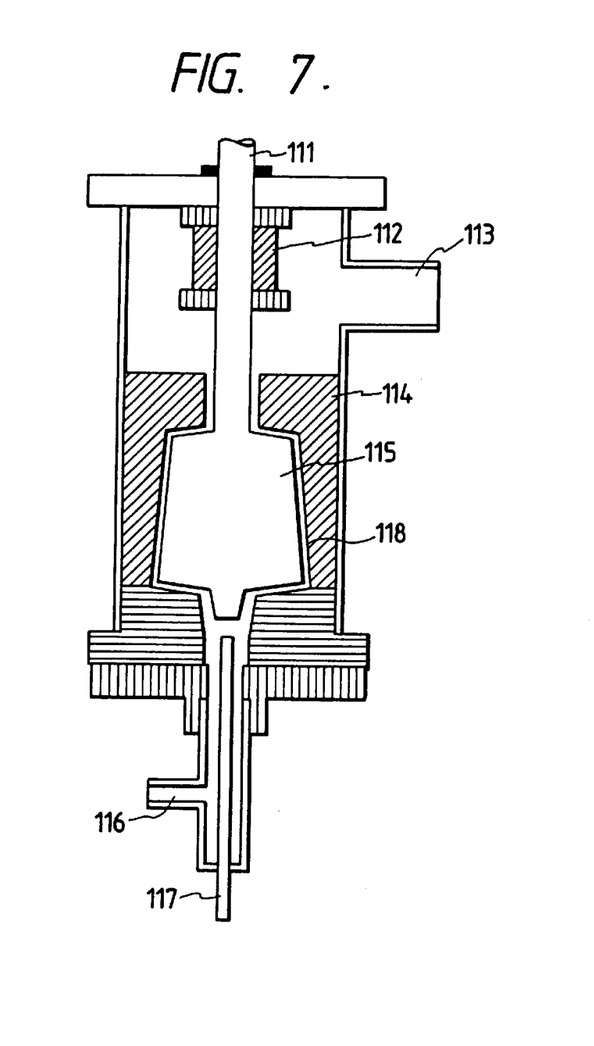
FIG. 7 is a longitudinal section of the disperser for use in the present invention.

FIG. 7 is a schematic longitudinal section showing an example of the disperser that can be used in this embodiment. Shown by 111 is a rotating turbine shaft having at its end the smooth-surfaced tubular rotating part 115. The shaft 111 is retained liquid-tight by means of an agitation seal 112. The stator 114 having an inner surface for defining an internal space is secured to the casing of the disperser. The tubular rotating part 115 is provided rotatably in the internal space of the stator. Shown by 113 is an outlet for dispersion, 116 is an inlet for the continuous phase, 117 is an inlet for the disperse phase, and 118 is the gap in which the dispersion is to be formed.

The method of this embodiment is implemented by the following procedure. A continuous phase component composed of a medium is retained in the vessel 1 whereas a disperse phase component composed of a monomeric composition is retained in the vessel 2. The two components are supplied simultaneously and continuously through independent passageways into an area close to the shear region in the disperser 5 by driving metering pumps 4 provided in those passageways.

The continuous phase component introduced into the disperser 5 at inlet 116 and the disperse phase component introduced at inlet 117 are subjected to shear force as they pass through the gap 118 between the tubular rotating part 115 and the stator 114, whereby a dispersion is formed that consists of the disperse phase and the continuous phase. The thus formed dispersion is discharged from the disperser at outlet 113 and sent to the reaction vessel 3 via a passageway. Suspension polymerization is carried out in the reaction vessel 3 in the usual manner.

The tubular rotating part in the disperser shown in FIG. 7 is tapered but it may have other shapes.

The tubular rotating part preferably has a length of at least 10 mm. The gap between the outer surface of the rotating part and the inner surface of the stationary part is preferably adjusted to lie within the range of 0.01–5.0 mm, more preferably 0.05–2.0 mm. The tubular rotating part is preferably rotated at a revolution speed of 3,000–50,000 rpm, more preferably at 10,000–30,000 rpm.

In the present invention, the disperse phase component and the continuous phase component are supplied simultaneously into the disperser at predetermined flow rates and, in the disperser, they are subjected to shear force in the narrow gap between the tubular rotating part and the stationary part, whereby the efficiency of shearing action is improved. Further, dispersing conditions such as the amount of droplets that pass through the shear region, their size and the ratio of disperse to continuous phase are placed under precise control to insure that both the disperse and continuous phases are subjected to shear force under conditions that are kept constant, whereby a dispersion comprising droplets of a narrow size distribution are obtained.

If particles of the desired size cannot be obtained by a single passage through the shear region, another disperser may be provided so that the dispersion that passed through the first disperser is passed through the second disperser. In other words, the process described in the previous paragraphs may be repeated as many times as required.

Also in this embodiment, a suspension stabilizer is preferably incorporated in the continuous phase.

As mentioned in connection with the first embodiment, suspension stabilizers that are commonly used in suspension polymerization are surface active materials having both a hydrophilic group and hydrophobic group in the molecule. Such surface active materials are those compounds in which polar groups such as a hydroxyl group, a carboxyl group or a salt thereof, and a sulfone group or a salt thereof are present as hydrophilic groups and nonpolar groups such as aliphatic and aromatic groups are present as hydrophobic groups and which are capable of stabilizing the dispersed droplets by preventing their coalescence.

Examples of such suspension stabilizers include polyvinyl alcohol, casein, gelatin, cellulosic derivatives such as methyl cellulose, methylhydroxypropyl cellulose and ethyl cellulose, starch and its derivatives, poly(meth)acrylic acid and salts thereof. Inorganic powder such as calcium phosphate powder and a fine silica powder are also often used as suspension stabilizers. These suspension stabilizers cover the surfaces of droplets so that they will not coalesce or agglomerate during polymerization.

If desired, neutral salts such as sodium chloride and sodium sulfate or surfactants such as vinyl benzoate, sodium dodecylsulfonate and sodium dodecylbenzenesulfonate may be added as aids for suspension stabilizers.

The disperse phase is formed of a disperse phase component composed of a monomeric composition. Any polymerizable monomers that are usable in suspension polymerization may be employed without particular limitation as the main component of the monomeric composition. Examples are: styrene and its derivatives such as styrene, o-methylstyrene, m-methylstyrene, p-methylstyrene, p-methyoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene and p-n-decylstyrene; vinyl esters of organic acids such as vinyl acetate, vinyl propionate and vinyl benzoate; methacrylic acid and its derivatives such as methacrylic acid, methyl methacrylate, ethyl methacrylate, propyl methacrylate, n-butyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylic acid and its derivatives such as acrylic acid, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate and phenyl acrylate; vinyl ketones such as vinyl methyl ketone, vinyl hexyl ketone and vinyl isopropenyl ketone; N-vinyl compounds such as N-vinylpyrrole, N-vinylcarbazole, N-vinylindole and N-vinylpyrrolidone; vinyl-naphthalenes; and other polymerizable monomers such as acrylonitrile, methacrylonitrile and acrylamide. These monomers may be used on their own or they may be combined to various formulations.

Polymerization initiators are used in the present invention and they are preferably soluble in polymerizable monomers. Exemplary polymerization initiators include azo or diazo compounds such as 2,2'-azobisisotutyronitrile, 2,2'-azobis-(2,4-dimethyl-valeronitrile), and 2,2'-azobis-4-methoxy-2,4-dimethylvaleronitrile, and peroxide compounds such as benzoyl peroxide, methyl ethyl ketone proxide and isopropyl peroxycarbonate.

In the present invention, two or more of the polymerization initiators listed above are preferably combined to various formulations for the purpose of controlling the molecular weight and its distribution or for the purpose of controlling the reaction time. If necessary, the polymerization initiators may be used in combination with water-soluble initiators such as ammonium persulfate and potassium persulfate.

The polymerization initiators are usually added in an amount of 0.1–20 parts, preferably 1–5 parts, per 100 parts of the polymerizable monomeric mixture.

Dyes, pigments and other ingredients may be added to the disperse phase as required. If pigments such as carbon black is added to the disperse phase, it can be used in the manufacture of electrophotographic toners.

The disperse phase component and the continuous phase component that are described above are introduced simultaneously into the disperser to prepare a dispersion comprising droplets having a predetermined size and size distribution and the dispersion is then subjected to suspension polymerization. A reaction for suspension polymerization is usually carried out at polymerization temperatures of at least 50° C. which should be determined taking into account the temperature at which the added polymerization initiator is dispersed. If the polymerization temperature is too high, the polymerization initiator will decompose rapidly to cause adverse effects on the molecular weight and other characteristics of the polymer.

The mechanism of action involved in the present invention is described below.

In the present invention the disperse phase component and the continuous phase component are supplied via independent passageways directly into an area close to the shear region in the disperse at desired flow rates. Since the disperser comprises a tubular rotating part having a smooth outer surface and a stationary part having a smooth inner surface, the narrow gap between the two parts define the shear region in which the supplied components are given shear force in an efficient way as they are concentrated in that small shear region. Hence, according to the present invention, dispersing conditions such as the amount of droplets that pass through the shear region, their size and the ratio of disperse to continuous phase are placed under strict control to insure that both the disperse and continuous phases are subjected to shear force under conditions that are kept constant, whereby a dispersion comprising droplets having a narrow size distribution is obtained.

EXAMPLES

The following examples are provided for the purpose of further illustrating the second embodiment but are in no way to be taken as limiting.

Example 3

A solution as a continuous phase component was prepared by dissolving polyvinyl alcohol (product of Tokyo Kasei K.K.; degree of polymerization, ca. 2,000; degree of saponification, ca. 80%) and sodium sulfate in water in respective amounts of 1% and 3% of water, the thus prepared continuous phase was charged into the container 21 shown in FIG. 1. A disperse phase component was prepared by dissolving 15 g of 2,2'-azobisisobutyronitrile in a mixture of styrene (400 g) and butyl acrylate (100 g) and charged into the container 22 shown in FIG. 1.

In the next step, the disperse phase component and the continuous phase component were supplied into a disperser. The disperser had the construction shown in FIG. 7 and the rotating part having a diameter of 50 mm at the thickest portion and that was spaced from the stationary part by a gap of 1.00 mm was run at 9,000 rpm. The dispersion emerging from the disperser was directed into the reaction vessel, in which a polymerization reaction was carried out at 85° C. for 8 hours under agitation with a turbine impeller at 300 rpm.

The polymer composition thus obtained was cooled, filtered, washed thoroughly with water and centrifuged to produce a slurry of polymer particles, which was then dried.

Figure 8:
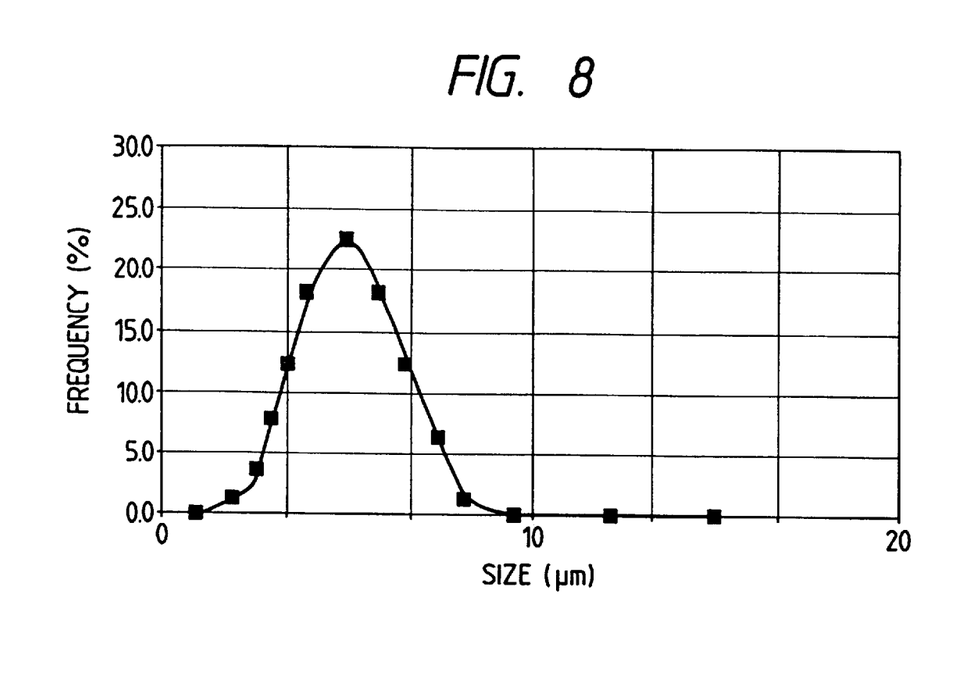
FIG. 8 is a graph showing the size distribution of the polymer particles produced in Example 3.

The size of the polymer particles was measured with a Coulter counter (aperture, 100 $\mu$m) and the results are shown by a size-frequency curve in FIG. 8. As shown, the polymer particles obtained in Example 1 had a narrow size distribution, with the frequency of occurrence being the highest for particles having a size of ca. 5.1 $\mu$m.

Example 4

A solution as a continuous phase was prepared by dissolving calcium phosphate and sodium dodecylsulfonate in water in respective amounts of 3% and 0.03% of water. The thus prepared continuous phase was charged into the container shown in FIG. 1. A disperse phase was prepared by dissolving 15 g of 2,2'-azobisisobutyronitrile in a mixture of styrene (400 g) and butyl acrylate (100 g) and charged into the container shown in FIG. 1. The subsequent procedures were the same as in Example 3.

Figure 9:
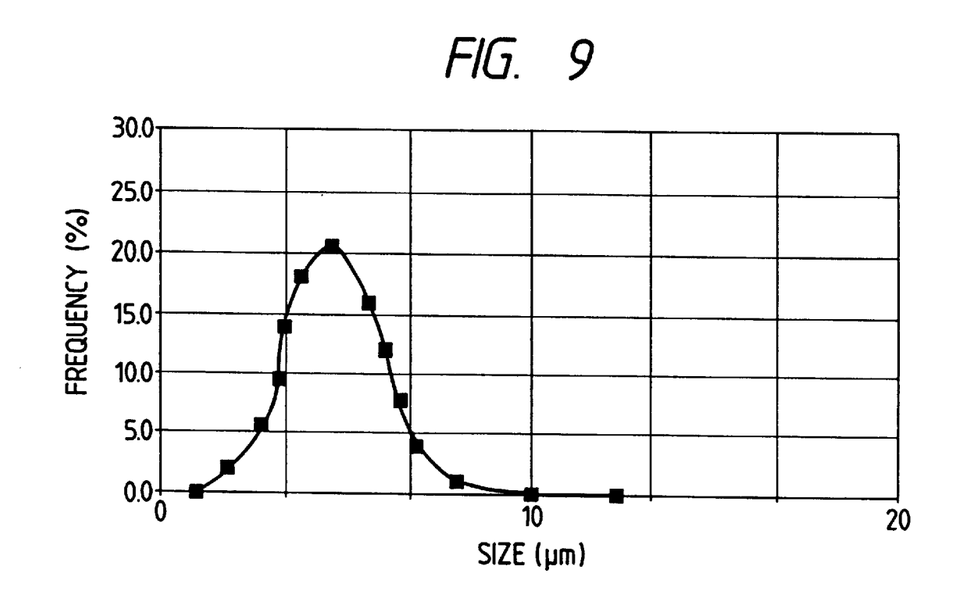
FIG. 9 is a graph showing the size distribution of the polymer particles produced in Example 4.

The size of the polymer particles obtained was measured with a Coulter counter (aperture, 100 $\mu$m) and the results are shown by a size-frequency curve in FIG. 9. As shown, the polymer particles obtained in Example 4 had a narrow size distribution, with the frequency of occurrence being the highest for particles having a size of ca. 4.8 $\mu$m.

Having the features described, the method of suspension polymerization of the present invention permits a disperse phase component and a continuous phase component to be supplied via independent passageways directly into an area close to the shear region in a disperser at desired flow rates. Further, shear force is exerted in a concentrated way in the narrow gap formed in the disperser between a tubular rotating part having a smooth outer surface and a stationary part having a smooth inner surface, and this enables the disperse phase to be dispersed in the continuous phase in a very efficient manner without foaming. Hence, according to the present invention, particle size and its distribution can be controlled in an easy way to permit the production of a polymer or a polymer composition that have a desired particle size and a narrow size distribution. This feature renders the present invention particularly useful in the manufacture of polymer materials that are required to have very small sizes and narrow size distributions.

Further, according to the present invention, the disperse phase component and the continuous phase component are prepared in independent vessels and supplied into the disperser through separate passageways, so the ratio of the two phases can be changed without causing substantial effects on other factors of manufacture. In addition, unlike conventional techniques that use batch reactors, the method of the present invention can be performed efficiently irrespective of the size of reaction vessel. Because of these advantages, the present invention increases the "flexibility" of process for manufacturing polymers or polymer compositions and is readily adaptable to scale up and other design change in the process of manufacture.

Figure 10:
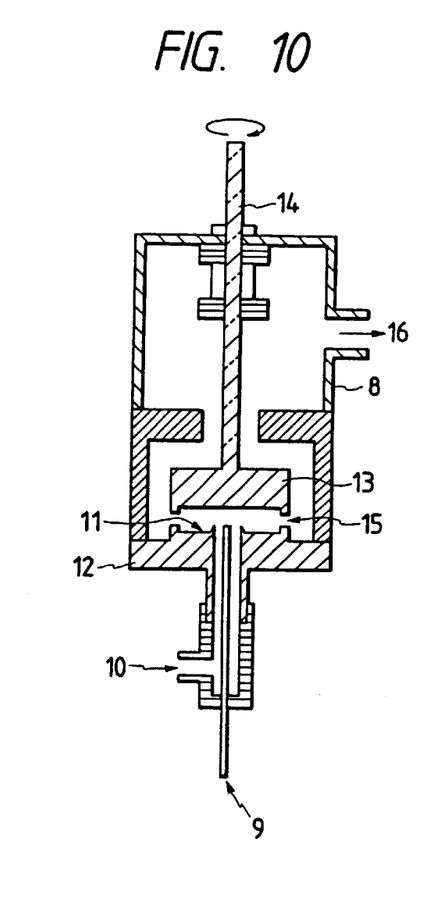
FIGS. 10 to 12 show modifications according to the present invention.
Figure 11:
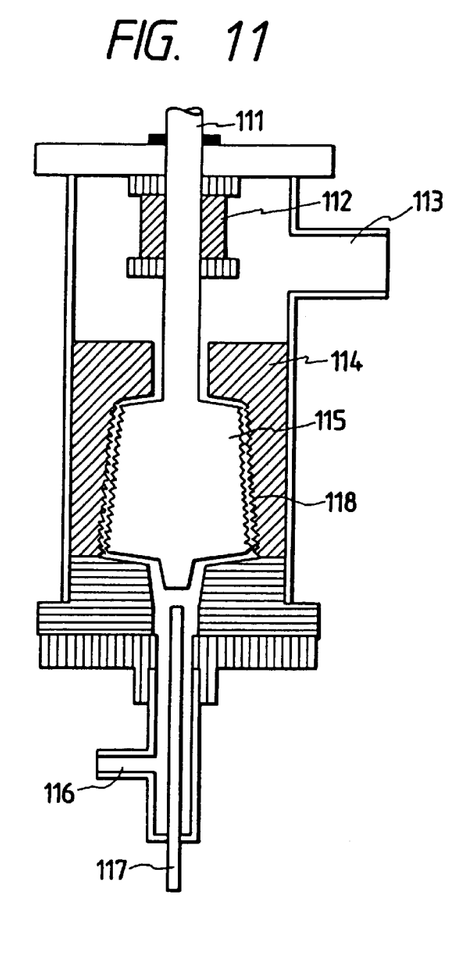

It is apparent that the invention is not limited to the foregoing specific examples and embodiments. For example, the asperities formed in the confronted surfaces of the stator 12 and the rotor 13 in FIG. 2 may be dispensed with and instead thereof, the smooth surfaces may be applied as shown in FIG. 10. In the same way, the smooth surfaces of the rotor 115 and the stator 118 shown in FIG. 7 may be displaced by the asperity or corrugation surfaces as shown in FIG. 11.

Figure 12:
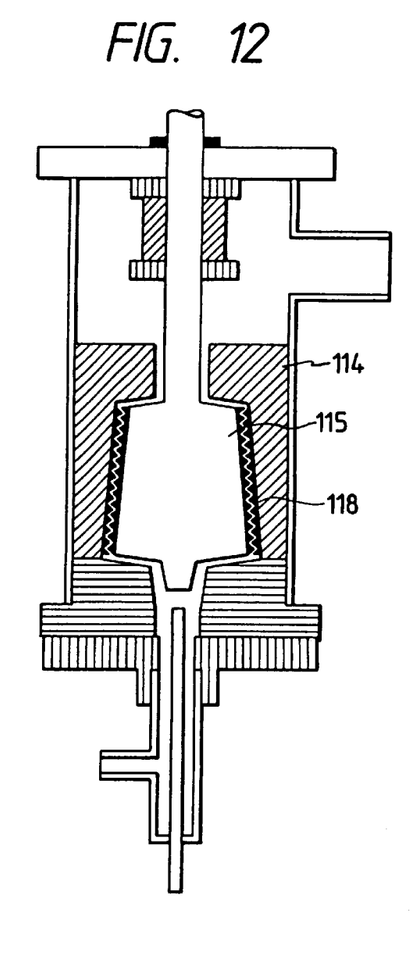

In using the asperities on the confronting surfaces of the stator and the rotor, it is more preferable that the asperities or corrugations of the confronting surfaces be complementarily arranged to form a constant clearance while allowing the rotation of the rotor 115, as shown in FIG. 12. With this arrangement, it is possible to increase an effective shearing surfaces since the complemental relation between the rotor and the stator 114 is kept during the rotation of the rotor 115. Of course, it is apparent that the cross section of the corrugation is not limited to the specific shape. It is possible to use asperities or corrugations having any cross sections such as triangular, rectangular, rounded ones.

What is claimed is:

1. An apparatus for suspension polymerization of a monomeric composition of uniformly sized particles having a narrow distribution, the apparatus comprising:

first retaining means for retaining a disperse phase component comprising a monomeric composition;

second retaining means for retaining a continuous phase component comprising a medium;

disperser means for forming a dispersion of the disperse phase component and the continuous phase component comprising a stationary part having a first circular surface and a second annular surface surrounding and concentric with the first surface, a rotating part having a third circular surface confronting the first surface and a fourth annular surface surrounding and concentric with the third surface and confronting the second surface, the first surface and the third surface having substantially the same shape and defining a space therebetween having substantially a uniform thickness, a first uniform shear generating field being disposed in the space, the second surface and the fourth surface having substantially the same shape and defining a gap therebetween having a second substantially uniform thickness, the second substantially uniform thickness being less than the first substantially uniform thickness and not more than about 1.8 mm, a second uniform shear generating field being disposed in the gap, the first and second uniform shear generating fields being substantially concentric and coplanar, the second uniform shear generating field being greater than the first uniform shear generating field;

first supplying means for supplying the disperse phase component from the first retaining means to the first shear force generating field at a constant rate;

second supplying means for supplying the continuous phase component from the second retaining means to the first shear force generating field at a constant rate, the first and second means being independent whereby the disperse phase component and the continuous phase component contact one another for the first time in the first shear force generating field, the first shear force generating field being sufficient to disperse the disperse phase component in the continuous phase component, and substantially all of the dispersion must pass through the gap after being dispersed in the first shear force generating field;

polymerization means for polymerizing the dispersion; and means for supplying the dispersion to the polymerization means.

2. The apparatus according to claim 1, wherein at least one of the first surface and the third surface having random asperities having a height of about 2 to 3 mm.

3. The apparatus according to claim 1, wherein at least one of the first surface and the third surface being substantially smooth.

4. The apparatus according to claim 1, further comprising means for controlling independently the flow of the disperse phase component and the continuous phase component into the shear force generating field.

5. The apparatus according to claim 1, wherein the rotating part has a rotary axis extending in a vertical direction and the first surface is confronted horizontally with the third surface.

6. An apparatus for suspension polymerization of a monomeric composition of uniformly sized particles having a narrow distribution comprising:

first retaining means for retaining a disperse phase component comprising a monomeric composition;

second retaining means for retaining a continuous phase component comprising a medium;

disperser means for forming a dispersion of the disperse phase component and the continuous phase component, the disperser means comprising a stationary part having an inner surface, a rotating part disposed within the stationary part having an outer surface, the inner and outer surfaces having substantially the same shape and defining a space therebetween having a substantially uniform thickness in the range of about 0.01 mm to about 5.0 mm, a uniform shear force generating disposed in the space;

first supplying means for supplying the disperse phase component from the first retaining means to the shear force generating field at a constant rate;

second supplying means for supplying the continuous phase component from the second retaining means to the shear force generating field at a constant rate, the first and second means being independent whereby the disperse phase component and the continuous phase component contact one another for the first time in the shear force generating field;

polymerization means for polymerizing the dispersion; and means for supplying the dispersion to the polymerization means.

7. The apparatus according to claim 6, the space thickness being in the range of about 0.05 to 2.0 mm.

8. The apparatus according to claim 6, at least one of the outer surface and the inner surface having random asperities having a height of about 2 to 3 mm.

9. The apparatus according to claim 6, at least one of the outer surface and the inner surface being smooth.

10. The apparatus according to claim 6, further comprising means for controlling independently the flow of the disperse phase component and the continuous phase component into the shear force generating field.

11. The apparatus according to claim 6, wherein the rotating part has a rotary axis extending in a vertical direction and the outer surface and the inner surface are substantially conformal.

12. An apparatus for suspension polymerization of a monomeric composition of uniformly sized particles having a narrow distribution, the apparatus comprising:

first retaining means for retaining a disperse phase component comprising a monomeric composition;

second retaining means for retaining a continuous phase component comprising a medium;

disperser means for forming a dispersion of the disperse phase component and the continuous phase component comprising a first rotating part having a first circular surface and a second annular surface surrounding and concentric with the first surface, a second rotating part having a third circular surface confronting the first surface and a fourth annular surface surrounding and concentric with the third surface and confronting the second surface, the first surface and the third surface having substantially the same shape and defining a space therebetween having substantially a uniform thickness, a first uniform shear generating field being disposed in the space, the second surface and the fourth surface having substantially the same shape and defining a gap therebetween having a second substantially uniform thickness, the second substantially uniform thickness being less than the first substantially uniform thickness and not more than about 1.8 mm, a second uniform shear generating field being disposed in the gap, wherein the first and second uniform shear generating fields are substantially concentric and coplanar, and further wherein the second uniform shear generating field is greater than the first uniform shear generating field;

first supplying means for supplying the disperse phase component from the first retaining means to the first shear force generating field at a constant rate;

second supplying means for supplying the continuous phase component from the second retaining means to the first shear force generating field at a constant rate, the first and second means being independent whereby the disperse phase component and the continuous phase component contact one another for the first time in the first shear force generating field, and substantially all of the dispersion must pass through the gap after being dispersed in the first shear force generating field;

polymerization means for polymerizing the dispersion; and means for supplying the dispersion to the polymerization means.

13. An apparatus for suspension polymerization of a monomeric composition of uniformly sized particles having a narrow distribution comprising:

first retaining means for retaining a disperse phase component comprising a monomeric composition;

second retaining means for retaining a continuous phase component comprising a medium;

disperser means for forming a dispersion of the disperse phase component and the continuous phase component, the disperser means comprising a first rotating part having an inner surface, a second rotating part disposed within the first rotating part having an outer surface, the inner and outer surfaces having substantially the same shape and defining a space therebetween having a substantially uniform thickness in the range of about 0.01 mm to about 5.0 mm, a uniform shear force generating field disposed in the space;

first supplying means for supplying the disperse phase component from the first retaining means to the shear force generating field at a constant rate;

second supplying means for supplying the continuous phase component from the second retaining means to the shear force generating field at a constant rate, the first and second means being independent whereby the disperse phase component and the continuous phase component contact one another for the first time in the shear force generating field;

polymerization means for polymerizing the dispersion; and means for supplying the dispersion to the polymerization means.

* * * * *